United States Patent [19]

Watanabe et al.

[11] Patent Number: 5,360,251

[45] Date of Patent: Nov. 1, 1994

[54] FLUSH MOUNT MOLDING MEMBER

[75] Inventors: Koji Watanabe; Toru Sugita, both of Kanagawa, Japan

[73] Assignee: NIFCO, Inc., Yokohama, Japan

[21] Appl. No.: 149,586

[22] Filed: Nov. 9, 1993

[51] Int. Cl.⁵ ............................................. B60J 10/02
[52] U.S. Cl. ...................................... 296/93; 296/201
[58] Field of Search ...................... 296/93, 201; 52/208

[56]  References Cited

U.S. PATENT DOCUMENTS

| | | | |
|---|---|---|---|
| 4,757,659 | 7/1988 | Miyakawa et al. | 52/400 |
| 4,757,660 | 7/1988 | Miyakawa et al. | 52/400 |
| 4,840,001 | 6/1989 | Kimisawa | 296/93 X |
| 4,865,796 | 9/1989 | Tamura et al. | 264/40 |
| 4,984,839 | 1/1991 | Miyakawa et al. | 296/93 |
| 5,039,157 | 8/1991 | Yada | 296/93 |
| 5,074,610 | 12/1991 | Tamura et al. | 296/93 |
| 5,154,471 | 10/1992 | Mimura et al. | 296/93 |
| 5,222,336 | 6/1993 | Yada et al. | 296/93 X |
| 5,233,805 | 8/1993 | Hirai et al. | 296/93 X |

FOREIGN PATENT DOCUMENTS 4108031 4/1992 Japan ..................... 296/93

Primary Examiner—Joseph D. Pape
Attorney, Agent, or Firm—Skjerven, Morrill, MacPherson, Franklin and Friel

[57] ABSTRACT

The molding member provides a substantially vertical wall along either side of the windshield, and a flush surface along the top side of the windshield so that rainwater on the surface of the windshield is prevented from flowing sideways along the side windows of the vehicle, and guided to the roof of the vehicle body. The transition from the middle portion of the molding member to the end portions is so gradual and smooth that it is highly pleasing to the eye, and would not create any undesirable aerodynamic disturbances. In particular, because the vertical walls on either side are defined as a smooth extension of the convex exterior surface of the head portion of the molding member, they can prevent accumulation of snow which otherwise may be produced along the side edges of the windshield as a result of operating a windshield wiper during snowfall but still effectively prevent the flow of rainwater to the side windows of the vehicle during rainfall.

8 Claims, 7 Drawing Sheets

FLUSH MOUNT MOLDING MEMBER

TECHNICAL FIELD

The present invention relates to a molding member which is placed in the gap between a windshield and a vehicle opening in which the windshield is installed for the purpose of keeping water out and securing the windshield in place.

BACKGROUND OF THE INVENTION

Conventionally, the windshield of a vehicle is fitted in an opening provided in a vehicle body by placing a molding member along the periphery of the windshield to keep rainwater out provide an air tight seal for the passenger compartment. Normally, a sealant is filled into the gap, and the windshield is secured in place by cooperation of the sealant and the molding member. The exterior of such a molding member is sometimes covered by an ornamental metallic member.

When the vehicle is travelling at high speed in rain, the rain water on the windshield tends to flow sideways, and this water flow is known to obstruct the view through the side windows, and sometimes the view through the rearview mirrors mounted on the doors. Therefore, the molding member is often provided with a vertical wall on either side of the windshield to guide the rainwater to the upper end of the windshield, and to the roof of the vehicle to avoid such a problem.

The molding member is therefore required to have a cross section which is different from one place to another for blocking the water flow across the side edges of the windshield but allowing the water flow across the upper edge of the windshield. This can be accomplished by connecting together three or more segments having different cross sections to make a single molding member, but this complicates the fabrication process and may not provide a molding member with a desirable appearance. It is therefore desired to produce a continuous molding member having a changing cross section. However, fabrication of such continuous molding members typically requires a highly complex extrusion die, or additional steps of cutting a part of a molding member of a uniform cross section to form a desired differing cross section.

BRIEF SUMMARY OF THE INVENTION

In view of such problems of the prior art, a primary object of the present invention is to provide a molding member adapted to be fitted in the gap between a windshield and an associated vehicle opening which defines a vertical wall of a certain height along either side edge of the windshield while presenting a highly continuous external appearance.

A second object of the present invention is to provide such a molding member which, additionally, is easy to fabricate and install.

A third object of the present invention is to provide such a molding member which is economical to fabricate.

A fourth object of the present invention is to provide such a molding member which is capable of effectively keeping out moisture.

These and other objects of the present invention can be accomplished by providing a molding member adapted to be fitted in a gap between a windshield and an associated opening of a vehicle body, the molding member extending along two side edges of the windshield and an upper edge of the windshield, the vehicle body opening being defined by a vertical wall portion extending substantially vertically from an outer wall portion of the vehicle body, the vertical wall portion being provided with a flange portion extending inwardly, behind the windshield, from a lower end of the vertical wall portion remote from the outer wall portion, comprising: a head portion extending between a part of the outer wall portion of the vehicle body peripheral to the vehicle body opening and a peripheral part of an external surface of the windshield; a leg portion extending from a middle part of the head portion into the gap between the windshield and the vertical wall portion of the vehicle body; at least one engagement piece extending from the leg portion toward the windshield or the vertical wall portion; the head portion being provided with a continuous extension of a side edge of the head portion adjacent to the windshield, the extension extending substantially in parallel with the leg portion and abutting the external surface of the windshield at a free end thereof; the extension having a full length along either side edge of the windshield, and a length of the extension being gradually reduced from the full length to a substantially zero length along a corner portion of the molding member extending between an upper end of each one of the side edges of the windshield to an associated lateral side end of the upper edge of the windshield.

The extension which changes its cross section along the length of the molding member can be appropriately formed by first forming the extension at its full length over the entire length of the molding member when extruding the molding member, and cutting it short in the middle part of the molding member corresponding to the upper edge of the windshield. If desired, the molding member may be formed with a extruder employing a variable extrusion die so that the cutting process may be eliminated. The leg portion is also desired to be cut short so as to correspond to the varying length of the extension. Likewise, this change in the length of the leg member may also be formed during the process of extrusion by using an appropriate variable extrusion die.

Preferably, the head portion and the extension define a substantially continuous convex external surface as seen in a cross section thereof. Thus, the molding member may present an external appearance which is smooth and pleasing to the eye. Furthermore, the overall smoothness of the external surface of the head portion prevents accumulation of snow along the side edges of the windshield when a windshield wiper is operated during snowfall.

So that the molding member may be curved or bent along each corner portion of the windshield without undesirably distorting the molding member, a part of the leg portion associated with each of the corner portions may be substantially removed.

Alternatively, the leg portion may be provided with a smooth surface devoid of the engagement pieces on an inner surface of a corner portion thereof so that a separate engagement member may be secured to the smooth surface, the engagement member being provided with oblique engagement means which smoothly connects the first engagement piece extending along the upper edge of the windshield and the third engagement piece extending along either side edge of the windshield. For securing the engagement member both easily and securely, the engagement member may be provided with a plurality of projections which are fittingly passed through corresponding openings provided in the corner portion of the leg portion.

It is also possible to employ a structure in which a part of the leg portion associated with each of the corner portions is substantially removed, and a separate attachment member is fitted in a void created by the removal of the leg portion in such a manner that the attachment member provides an extension of the leg portion which smoothly connects the leg portion of each of the side edges of the windshield with the leg portion of the top edge of the windshield, and a pair of engagement pieces which smoothly connect the third and fourth engagement pieces of each of the side edges of the windshield with the first and second engagement pieces of the top edge of the windshield, respectively.

BRIEF DESCRIPTION OF THE DRAWINGS

Now the present invention is described in the following with reference to the appended drawings, in which.

DETAILED DESCRIPTION OF THE PREFERRED EMBODIMENTS

FIGS. 1 through 5 show a first embodiment of the molding member according to the present invention.

Figure 1:
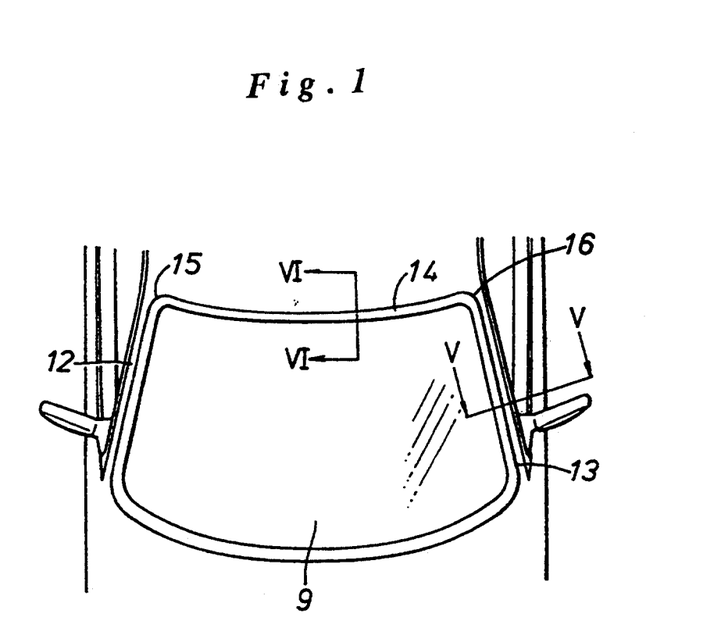
FIG. 1 is a perspective view of a motor vehicle showing how the molding member of the present invention is installed.

Referring to FIG. 1, this molding member is interposed between the edge of a windshield 9 and an associated opening of the vehicle body, and comprises a middle portion 14 extending along the upper edge of the windshield 9, two end portions 12 and 13 extending along the side edges of the windshield 9, and corner portions 15 and 16 connecting the middle portion 14 to the end portions 12 and 13, respectively.

Figure 2:
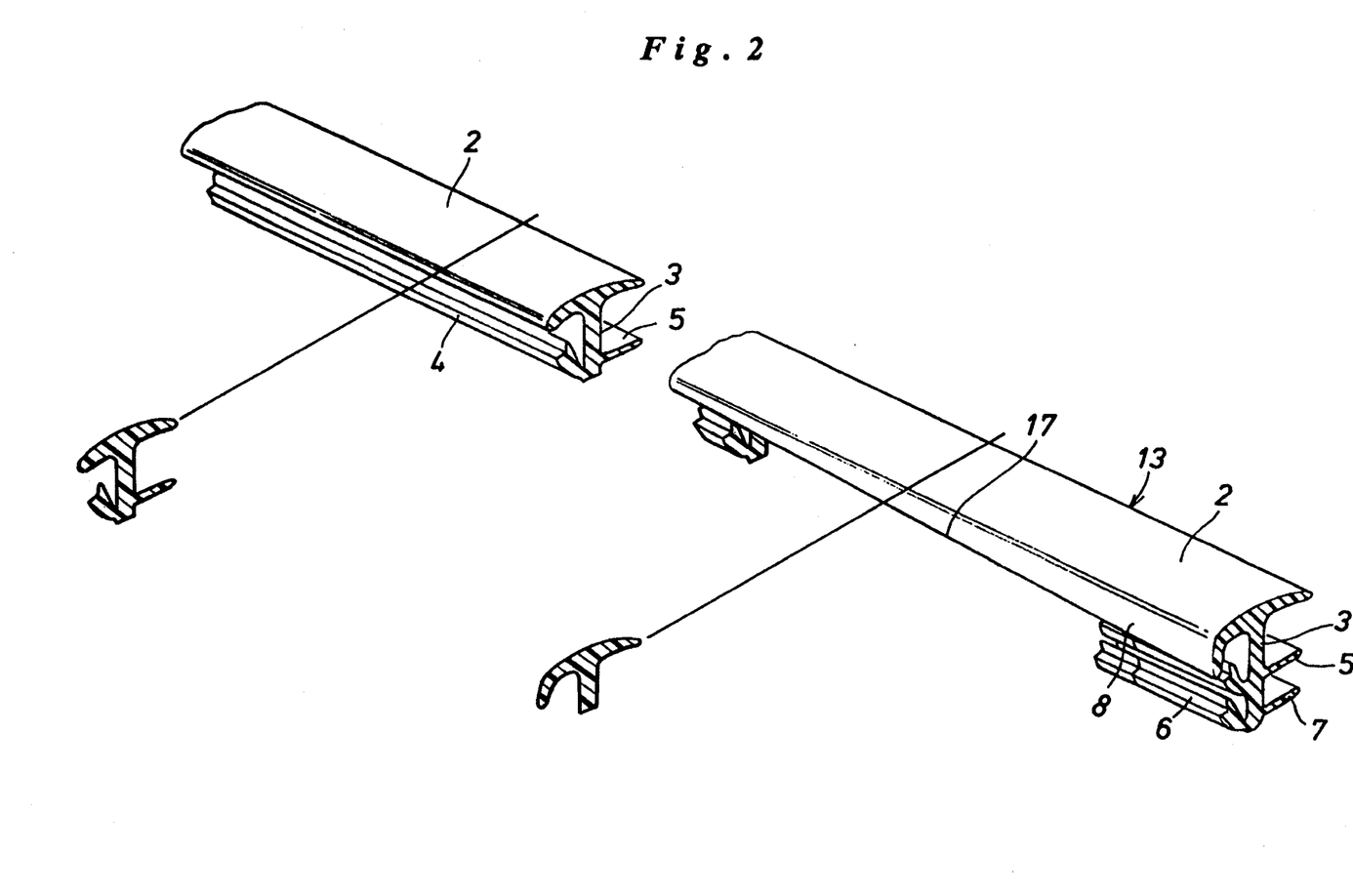
FIG. 2 is a partly broken away perspective view of a first embodiment of the molding member according to the present invention.
Figure 3:
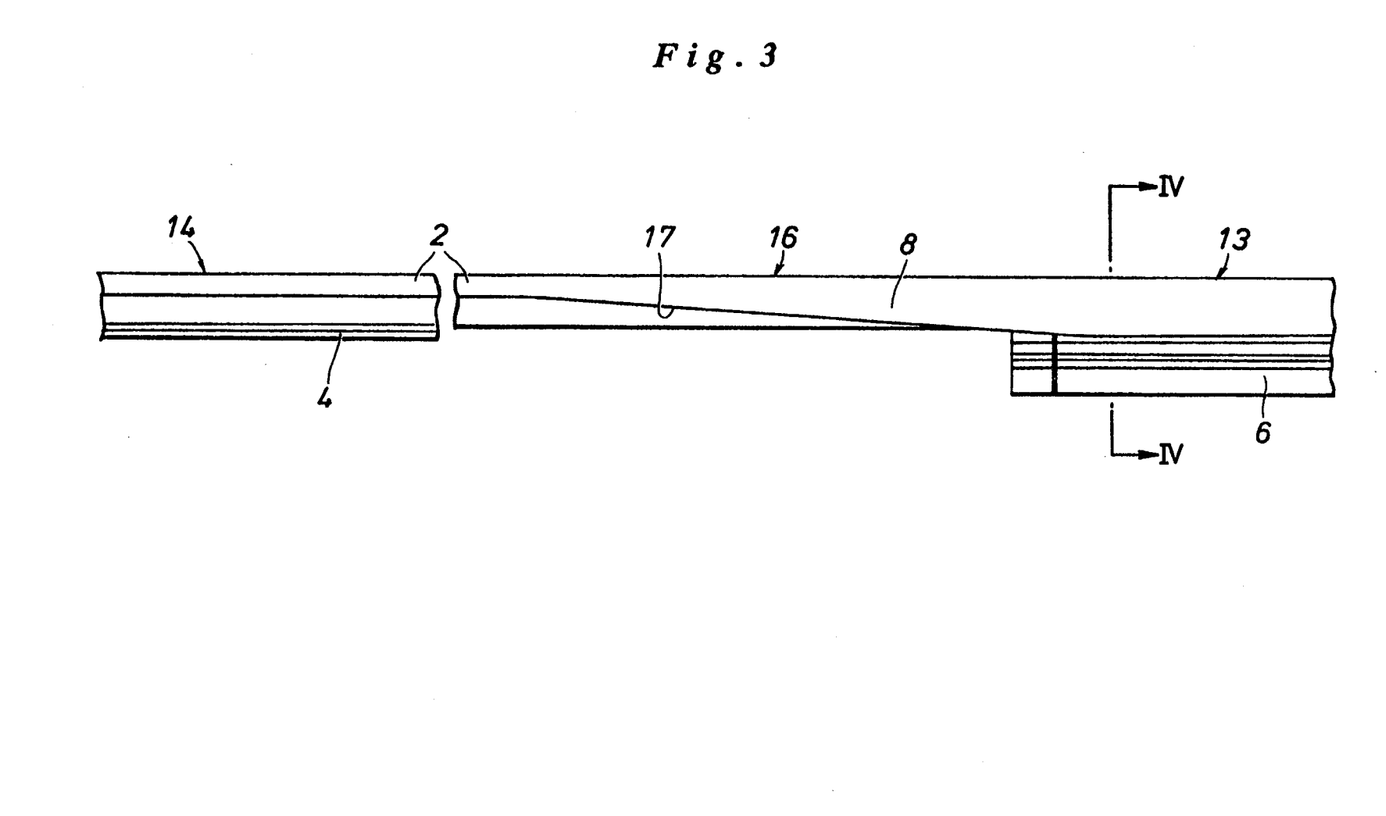
FIG. 3 is a partly broken away side view of the molding member.
Figure 4:
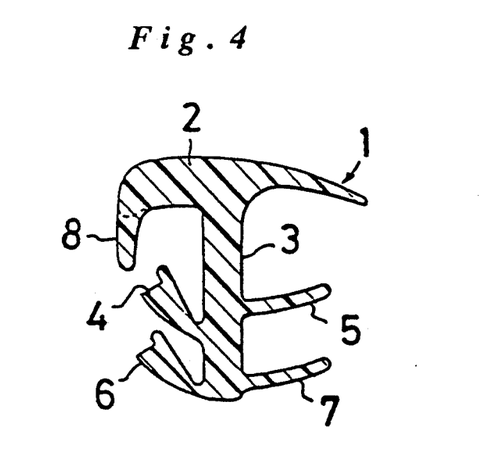
FIG. 4 is a sectional view taken along line IV—IV of FIG. 3.

Referring to FIGS. 2 through 4, the flush mount molding member generally designated with numeral 1 is made of extruded thermoplastic synthetic resin material, preferably soft polyvinyl chloride resin, and comprises, as seen in its cross section, a head portion 2 extending laterally in two directions in the manner of a flange and presenting a generally convex upper surface, a leg portion 3 descending from a middle part of the head portion 2, first and third engagement pieces 4 and 5 extending laterally from a middle portion of the leg portion 3 in either direction, and second and fourth engagement pieces 6 and 7 extending laterally from a lower end of the leg portion 3 in either direction. An extension 8 extends from one of the lateral edges of the head portion 2 as more fully described hereinafter.

As best illustrated in FIG. 4, the head portion 2 is slightly asymmetric with its left hand side thicker than its right hand side, and the extension 8 extends from the side of the head portion 2 which is thicker than the other.

Figure 5:
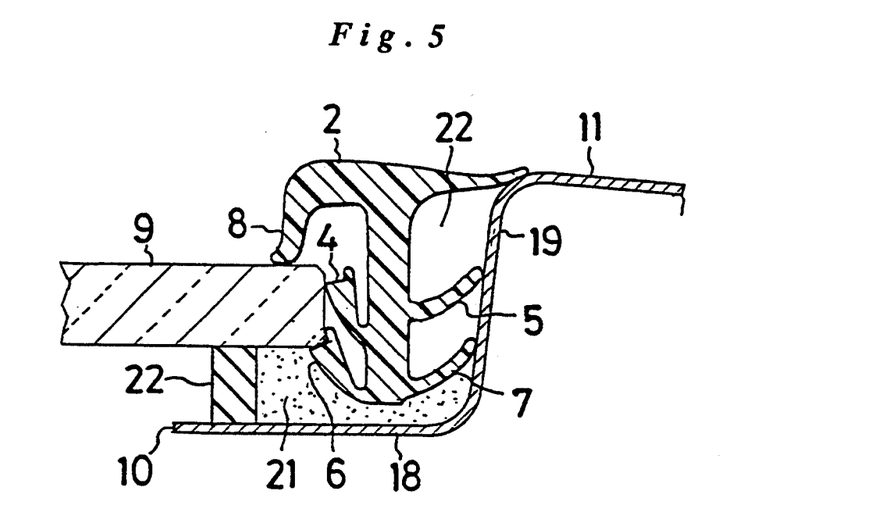
FIG. 5 is a sectional view taken along line V—V of FIG. 1.

As shown in FIG. 5, the thinner side of the head portion 2 rests upon a peripheral part of an outer wall portion 11 of the vehicle body surrounding the window opening, with a suitable elasticity, and the thicker side of the head portion 2 or its extension 8 rests upon a peripheral part of the windshield 9. The window opening is defined by a vertical wall portion 19 extending from the outer wall portion 11. As can be understood by comparing FIGS. 5 and 6, the extension 8 is provided only in the two end portions 12 and 13 or along either side edge of the windshield 9 and not in the middle portion 14.

Figure 6:
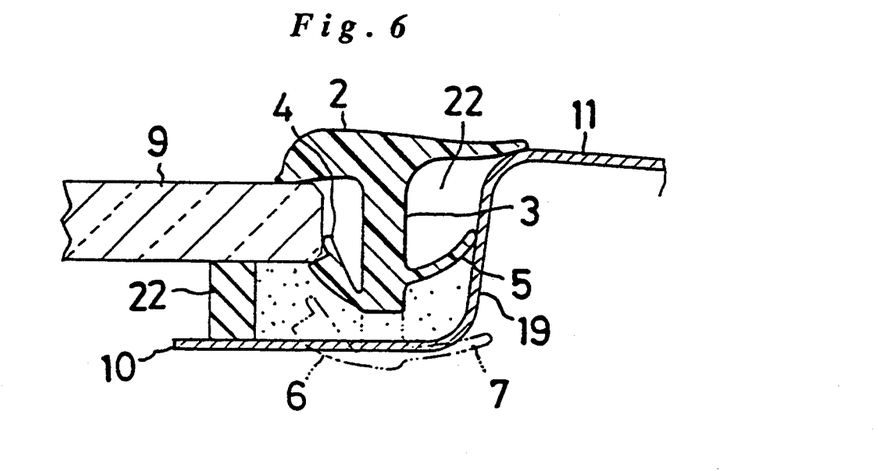
FIG. 6 is a sectional view taken along line VI—VI of FIG. 1.

As shown in FIGS. 2 and 3, the extension 8 is gradually reduced in length from the end portion 12 or 13 to the middle portion 14, along the corner portion 15 or 16, as indicated by numeral 17. The leg portion 3, on the other hand, is simply cut off in each corner portion 15 or 16 to allow the corner portion to be bent or curved along the corresponding corner of the windshield opening of the vehicle body. It should be noted that, as shown in FIGS. 5 and 6, the inner periphery of the flange 18 defines an effective vehicle body opening 10, and the length of the side wall portion 19 is changed from the side end to the upper end of the vehicle body opening as required to accommodate the corresponding change in the length of the leg portion 3.

The first through fourth engagement pieces 4 through 7 serve as means for securely anchoring the molding member 1 in the gap between the windshield 9 and the vertical wall portion 19. The first engagement piece 4 extends toward the windshield 9 with an approximately 45 degree upward angle, and the second engagement piece 5 extends substantially laterally in the opposite direction from the first engagement piece 5 so as to support the latter from the rear. The third engagement piece 6 extends substantially in parallel with the first engagement piece 4 so as to receive the windshield 9 between the free end of the extension 8 and the third engagement piece 6. The fourth engagement piece 7 extends substantially in parallel with the second engagement piece 5 so as to support the third engagement piece 6 from the rear. Each of the second and fourth engagement pieces 5 and 7 has a uniform thickness over its entire length, but each of the first and third engagement pieces 4 and 6 has a thickness which increases from its base end toward the free end.

This molding member 1 can be fabricated in a continuous manner by extrusion. The change in the cross section can be effected either by appropriately modifying the structure of the extrusion die during each extrusion cycle or extruding a molding member of a uniform cross section and cutting off unnecessary parts as required either while the molded product is warm or after it has been cooled. It is also possible, instead of cutting off the leg portion 3 along each corner portion 15 or 16, to provide a number of vertical slits of a suitable width across the inner surface of the leg portion 3 of the corner portion 15 or 16, including the first and third engagement pieces 4 and 6, so that the molding member 1 may be appropriately curved at each of the corner portions 15 and 16 without creating creases and other undesirable distortions.

Before mounting this molding member 1 on a vehicle body, in addition to cutting off the leg portion 3 in each corner portion 15 or 16, the leg portion 3 for the part of the molding member located along the upper edge of the windshield is cut off so as to reduce its height along the upper edge of the windshield 9 as required. As a result, the third and fourth engagement pieces 6 and 7 are removed as far as the middle portion 14 of the molding member 1 is concerned, and the first through fourth engagement pieces 4, 5, 6 and 7 are removed as far as each corner portion 15 or 16 is concerned.

When mounting a windshield on a vehicle body, first of all, the windshield 9 is placed on the opening 10 in the vehicle body, and provisionally secured in position by a sealant 21 in the gap between the windshield 9 and the flange 18 of the vehicle body. The molding member 1 is then pushed into the gap between the vertical wall portion 19 and the edge of the windshield 9 with the leg portion 3 first, until the lower end of the leg portion 3 is pushed into the sealant 21 and the two side edges of the head portion 2 abut the upper surface of the windshield 9 and the peripheral part of the outer wall portion 11 of the vehicle body, respectively. Because the lateral expanse of the engagement pieces 4 through 7 in their initial state is substantially greater than the width of the gap between the edge of the windshield 9 and the vertical wall portion 19, the engagement pieces 4 through 7 are elastically stressed in their mounted state. Numeral 22 denotes a dam rubber for containing the flow of sealant 21 in the gap.

As can be seen from FIGS. 5 and 6, the extension 8 provides a vertical wall of a certain height along the periphery of the windshield 9 as far as the side edge of the vehicle body opening is concerned, but provides a substantially smooth or flush surface from the surface of the windshield to the upper surface of the head portion 2 and then to the outer surface of the vehicle body as far as the upper edge of the vehicle body opening is concerned.

Figure 7:
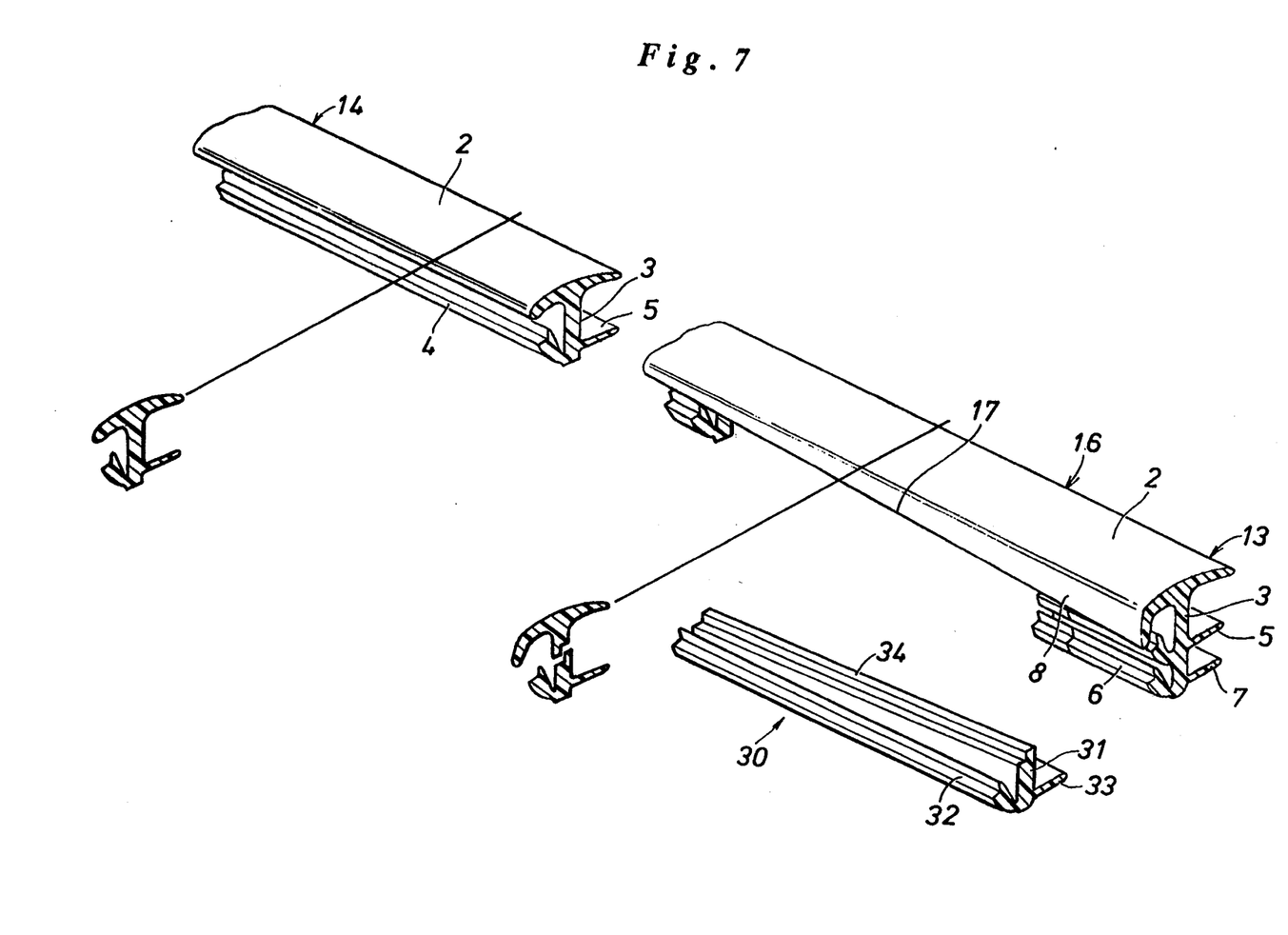
FIG. 7 is a partly broken away perspective view of a corner portion of a second embodiment of the molding member according to the present invention.

FIGS. 7 shows a second embodiment of the present invention which is different from the first embodiment in the structure of the corner portions 15 and 16. In this embodiment, the leg portion 3 is simply cut off as was the case with the first embodiment, and an attachment member 30 is fitted in the void created by the removal of the leg portion 3 at each corner portion so as to connect each end portion 12 or 13 and the middle portion 14 in a more continuous manner.

The attachment member 30 is preferably made of the same material as the rest of the molding member, and comprises a leg portion 31 which complements the leg portion 3 but has a length linearly changing from that of the leg 3 of the end portion 13 and that of the leg 3 of the middle portion 14. The lower edge of the attachment member 30 is provided with engagement pieces 32 and 33 which align with the engagement pieces 6 and 7, respectively, at its longitudinal end adjoining the end portion 12 or 13, and with the engagement pieces 4 and 5, respectively, at its longitudinal end adjoining the middle portion 14. The upper edge 34 of the attachment member 30 abuts the associated lower edge of the leg portion 3 of the corner portion 16 in the manner of a lap joint.

Thus, according to this embodiment, the overall leg portion 3 (including the leg portion 31) is reduced in height from the end portion 12 or 13 to the middle portion 14 so that the lower end of the leg portion 3 is always located close to the upper surface of the flange 18 which extends inwardly from the lower end of the vertical wall portion 19 while the two side edges of the head portion 2 maintain a proper state of contact with the vehicle body and the windshield 9, respectively.

Figure 8:
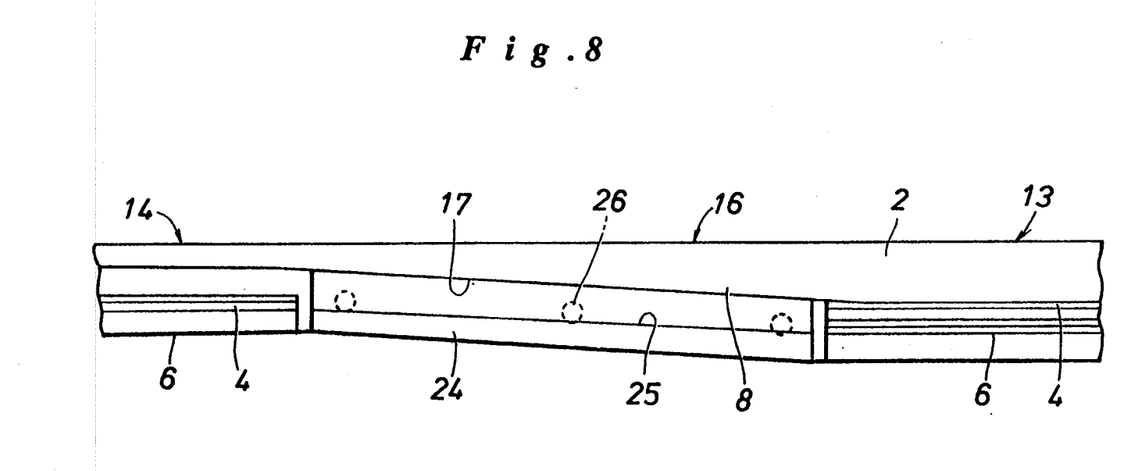
FIG. 8 is a side view of a corner portion of a third embodiment of the molding member according to the present invention.
Figure 9:
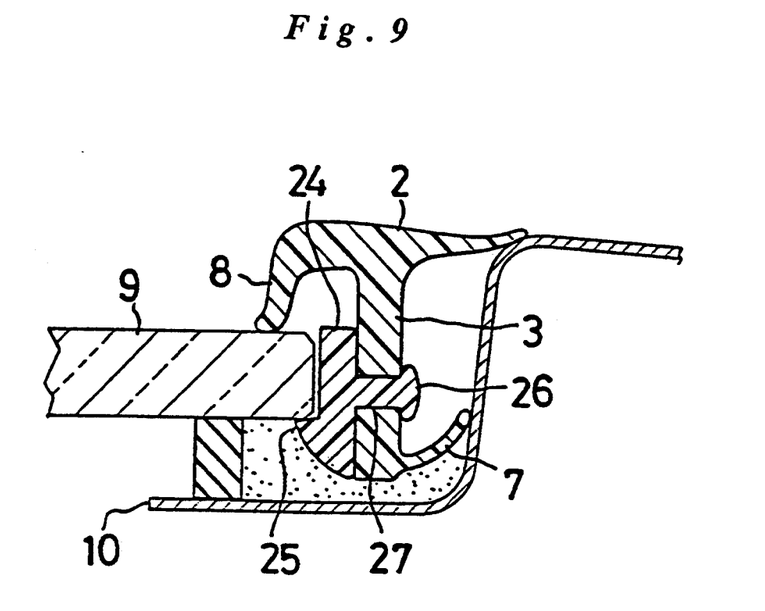
FIG. 9 is a sectional view similar to FIG. 5, showing the third embodiment of the present invention.

FIGS. 8 and 9 show a third embodiment of the present invention which is different from the first embodiment in the structure of the corner portions 15 and 16. In this embodiment, the inner surface of the leg portion 3 of each of the corner portions 15 and 16 has a smooth surface, that is devoid of the engagement pieces 4 and 6. Instead, a corner member 24 is secured to this smooth surface.

This corner member 24 may be made of either flexible material like the rest of the molding member 1 or material of a suitable rigidity as long as it can ultimately conform to the shape of the gap between the windshield and the vehicle body at each of the corner portions 15 and 16. The corner member 24 comprises a main body provided with an engagement claw 25 extending along the entire length of its inner surface for engaging the inner surface of the windshield 9, and projections 26 which are adapted to be inserted in corresponding openings 27 provided in the leg portion 3 of the molding member 1 for securing the corner member 24 to the molding member 1.

As best illustrated in FIG. 8, the engagement claw 25 runs obliquely with respect to the upper surface of the head portion 2 so as to connect the first engagement piece 4 of the middle portion to the third engagement piece 6 of the corresponding end portion 12 or 13. Thus, according to this embodiment, the windshield 9 is engaged either by one of the engagement pieces 4 and 6 or by the engagement claw 25 of the corner member 24 without any break along the edges of windshield 9 including the edge near each corner portion and adjacent parts of the molding member 1. Therefore, this embodiment is capable of supporting the windshield in a highly secure manner.

Thus, according to the present invention, since the molding member provides a substantially vertical wall along either side of the windshield, and a flush surface along the top side of the windshield, rainwater on the surface of the windshield is prevented from flowing sideways along the side windows of the vehicle, and is guided to the roof of the vehicle body.

Furthermore, the transition from the middle portion of the molding member to the end portions is so gradual and smooth that it is highly pleasing to the eye, and would not create any undesirable aerodynamic disturbances. In particular, because the vertical walls on either side are defined as a smooth extension of the convex exterior surface of the head portion of the molding member, they can prevent accumulation of snow which otherwise may be produced along the side edges of the windshield as a result of operating a windshield wiper during snowfall and still effectively prevent the flow of rainwater to the side windows of the vehicle.

The assembly work is highly simple, but the molding member can be securely fixed in place, and any water leakage and trapping of rainwater can be effectively avoided.

Although the present invention has been described in terms of specific embodiments thereof, it is possible to modify and alter details thereof without departing from the spirit of the present invention.

What we claim is:

1. A molding member adapted to fit in a gap between a windshield and an associated opening of a vehicle body, said molding member extending along two side edges of said windshield and an upper edge of said windshield, said vehicle body opening being defined by a vertical wall portion extending substantially vertically from an outer wall portion of said vehicle body, said vertical wall portion being provided with a flange portion extending inwardly, behind said windshield, from a lower end of said vertical wall portion remote from said outer wall portion, comprising:

a head portion extending between a part of said outer wall portion of said vehicle body peripheral to said vehicle body opening and a peripheral part of an external surface of said windshield;

a leg portion extending from a middle part of said head portion into said gap between said windshield and said vertical wall portion of said vehicle body; and first and second engagement pieces extending from said leg portion toward said windshield, wherein:

said head portion has a continuous extension of a side edge of said head portion adjacent to said windshield, said extension extending substantially in parallel with said leg portion and abutting said external surface of said windshield at a free end thereof;

said extension has a full length along either side edge of said windshield, and a length that gradually decreases from said full length to a substantially zero length along a corner portion of said molding member extending between an upper end of each one of said side edges of said windshield to an associated lateral side end of said upper edge of said windshield;

said second engagement piece extends along both of said side edges and said windshield and ends at said corner portions of said molding member; and said first engagement piece extends along both of said side edges and said top edge of said windshield and is absent from said corner portions of said molding member.

2. A molding member according to claim 1, wherein said head portion and said extension define a substantially continuous convex external surface as seen in a cross section thereof.

3. A molding member according to claim 1, wherein a part of said leg portion associated with each of said corner portions is substantially removed.

4. A molding member according to claim 1, wherein a part of said leg portion associated with each of said corner portions has a varying length which decreases in proportion to a decrease in the length of said extension.

5. A molding member according to claim 1, wherein said leg portion is provided with third and fourth engagement pieces extending from said leg portion toward said vertical wall portion of said vehicle body.

6. A molding member adapted to fit in a gap between a windshield and an associated opening of a vehicle body, said molding member extending along two side edges of said windshield and an upper edge of said windshield, said vehicle body opening being defined by a vertical wall portion extending substantially vertically from an outer wall portion of said vehicle body, said vertical wall portion being provided with a flange portion extending inwardly, behind said windshield, from a lower end of said vertical wall portion remote from said outer wall portion, said molding member comprising:

a head portion extending between a part of said outer wall portion of said vehicle body peripheral to said vehicle body opening and a peripheral part of an external surface of said windshield;

a leg portion extending from a middle part of said head portion into said gap between said windshield and said vertical wall portion of said vehicle body;

first and second engagement pieces extending from a middle part of said leg portion toward said windshield and said vertical wall portion of said vehicle body, respectively, over an entire length of said molding member;

third and fourth engagement pieces extending from a lower end portion of said leg portion toward said windshield and said vertical wall portion of said vehicle body, respectively, along either side edge of said windshield;

said head portion being provided with a continuous extension of a side edge of said head portion adjacent to said windshield, said extension extending substantially in parallel with said leg portion and abutting said external surface of said windshield at a free end thereof;

said extension having a full length along either side edge of said windshield and a length which gradually decreases from said full length to a substantially zero length along a corner portion of said molding member extending between an upper end of each one of said side edges of said windshield to an associated lateral side end of said upper edge of said windshield, wherein a part of said leg portion associated with each of said corner portions is substantially removed, and a separate attachment member is fitted in a void created by said removal of said leg portion in such a manner that said attachment member provides an extension of said leg portion which smoothly connects said leg portion of each of said side edges of said windshield with said leg portion of said top edge of said windshield, and a pair of engagement pieces which smoothly connect said third and fourth engagement pieces of each of said side edges of said windshield with said first and second engagement pieces of said top edge of said windshield, respectively.

7. A molding member according to claim 1, wherein a part of said leg portion associated with each of said corner portions has a smooth surface, and a separate engagement member is secured to said smooth surface, said engagement member being provided with oblique engagement means which smoothly connects said first engagement piece extending along said upper edge of said windshield and said second engagement piece extending along either side edge of said windshield.

8. A molding member according to claim 7, wherein said engagement member is provided with a plurality of projections which are fittingly passed through corresponding openings provided in said corner portion of said leg portion.

* * * * *